US012811489B2

(12) United States Patent
Zhang et al.

(10) Patent No.: US 12,811,489 B2
(45) Date of Patent: Nov. 24, 2026

(54) SWITCHED-CAPACITOR COUPLED-INDUCTOR CONVERTER AND CONTROL METHOD THEREOF

(71) Applicant: NANJING EFFICIENT POWER FOR INTELLIGENT COMPUTING TECHNOLOGIES CO. LTD., Nanjing (CN)

(72) Inventors: Jinfeng Zhang, Nanjing (CN); Xufu Ren, Nanjing (CN); Pengcheng Xu, Nanjing (CN); Jibin Song, Nanjing (CN); Teng Long, Nanjing (CN)

(73) Assignee: NANJING EFFICIENT POWER FOR INTELLIGENT COMPUTING TECHNOLOGIES CO. LTD., Nanjing (CN)

( * ) Notice: Subject to any disclaimer, the term of this patent is extended or adjusted under 35 U.S.C. 154(b) by 0 days.

(21) Appl. No.: 18/928,532

(22) Filed: Oct. 28, 2024

(65) Prior Publication Data

US 2025/0141337 A1 May 1, 2025

(30) Foreign Application Priority Data

Oct. 26, 2023 (CN) ......................... 202311402396.8
Dec. 4, 2023 (CN) ......................... 202311651470.X

(51) Int. Cl.

| | |
|---|---|
| ***H02M 1/14*** | (2006.01) |
| ***H02M 1/00*** | (2007.01) |
| ***H02M 3/158*** | (2006.01) |

(52) U.S. Cl.
CPC ........... *H02M 1/0095* (2021.05); *H02M 1/14* (2013.01); *H02M 3/158* (2013.01)

(58) Field of Classification Search
None
See application file for complete search history.

(56) References Cited

FOREIGN PATENT DOCUMENTS

CN 111416516 A 7/2020

OTHER PUBLICATIONS

Roberto Rizzolatti et. al, High Density Hybrid Switched Capacitor Converter for Data-Center Application, Jun. 2021, 2021 IEEE Applied Power Electronics Conference and Exposition (APEC), IEEE, DOI: 10.1109/APEC42165.2021.9487136 (Year: 2021).*

(Continued)

*Primary Examiner* — Crystal L Hammond
*Assistant Examiner* — Seung Ho Choi
(74) *Attorney, Agent, or Firm* — Oliff PLC

(57) ABSTRACT

A switched-capacitor coupled-inductor converter includes a converter, and near- and far-end power conversion units connected in parallel between positive and negative input interfaces. An output capacitor is arranged between the output interfaces. Each of the near- and far-end power conversion units include power switches $Q_1$-$Q_3$ and $Q_4$-$Q_6$ connected in series. The converter includes two coupled inductors having a same number of turns. An undotted terminal of one coupled inductor is connected to a dotted terminal of the other coupled inductor. A capacitor $C_1$ is arranged between a node between $Q_1$ and $Q_4$ of the near-end power conversion unit and a ground terminal node of $Q_3$ of the far-end power conversion unit. A capacitor $C_2$ equal to the capacitor $C_2$ is arranged at a node between a ground terminal node of $Q_4$ of the near-end power conversion unit and $Q_2$ of the far-end power conversion unit.

5 Claims, 5 Drawing Sheets

(56) References Cited

OTHER PUBLICATIONS

Stefano Saggini et. al, A 99% Efficient Dual-Phase Resonant Switched-Capacitor-Buck Converter for 48 V Data Center Bus Conversions, Mar. 2019, 2019 IEEE Applied Power Electronics Conference and Exposition (APEC), IEEE, DOI: 10.1109/APEC.2019.8721860 (Year: 2019).*
Cheng Li et.al, A Comparative Study of Hybrid DC-DC Converters by Indirect Power, Jun. 2021, 2021 IEEE Applied Power Electronics Conference and Exposition (APEC), IEEE, DOI: 10.1109/APEC42165.2021.9487237 (Year: 2021).*

* cited by examiner

SWITCHED-CAPACITOR COUPLED-INDUCTOR CONVERTER AND CONTROL METHOD THEREOF

TECHNICAL FIELD

The present invention relates to a switched-capacitor coupled-inductor converter and a control method thereof.

BACKGROUND

At this stage, in a step-down large-current output direct current power conversion system, a hybrid switched-capacitor conversion circuit is often used, as shown in FIG. 1 (derived from a hybrid switched-capacitor converter in CN111416516 A). The hybrid switched-capacitor conversion circuit has a large number of advantages, such as a low switching loss and a relatively small current stress. Therefore, such a converter can operate at a high switching frequency (from several hundred kilohertz to several megahertz), thereby significantly reducing the volume of a magnetic element required by a converter and greatly increasing the power density.

However, for a circuit shown in FIG. 1, a voltage conversion ratio may be flexibly adjusted by changing a turns ratio of a converter. However, the converter of the circuit has two primary windings and two secondary windings, which leads to a complex multi-winding coupling relationship and a high-frequency current circuit, and brings great challenges to the design of the converter. This limits improvement of efficiency of the converter and an increase in the power density to some extent. In addition, since the converter is a fixed-frequency resonant converter, a fixed-frequency square wave with 50% of a duty cycle needs to be provided if a topology is caused to normally operate, so that the converter exactly operates in a resonant state. Therefore, once the converter is designed (such as the design such as a turns ratio of the converter, a resonant capacitor, leakage inductance of the converter, and a resonant frequency), a state has been determined, and an operating state cannot be changed by using an external signal. The converter has a single function and can only implement a fixed conversion ratio. If different conversion ratios need to be implemented, a hardware circuit needs to be changed, which is a major defect in a data center application. Because in this application scenario, to realize voltage stabilization of an output terminal, that is, no matter how the input and load change, an approximately constant output needs to be kept. Therefore, it is required to control real-time voltage regulation through software without operating a hardware circuit, and this circuit cannot implement adjustability of the output by controlling the duty cycle.

Therefore, how to develop a power conversion system that may improve the foregoing prior art is an urgent need at present.

SUMMARY

A technical problem to be resolved in the present invention is to provide a switched-capacitor coupled-inductor converter. The switched-capacitor coupled-inductor converter may flexibly implement a direct current voltage conversion ratio of X:1, where X is any numerical value greater than or equal to 2. The switched-capacitor coupled-inductor converter has a low output ripple, a high dynamic response rate, and a high power density, and may be used as a data center bus converter, an on-board bus converter, and the like.

To resolve the above technical problem, the technical solution adopted in the present invention is as follows. A switched-capacitor coupled-inductor converter is provided, including a positive input interface, a negative input interface, a positive output interface, a negative output interface, a converter, and a near-end power conversion unit and a far-end power conversion unit connected in parallel between the positive input interface and the negative input interface, where an output capacitor is arranged between the positive output interface and the negative output interface, the near-end power conversion unit includes a near-end first power switch $Q_1$, a near-end second power switch $Q_4$, and a near-end third power switch $Q_5$ connected in series, the far-end power conversion unit includes a far-end first power switch $Q_2$, a far-end second power switch $Q_3$, and a far-end third power switch $Q_6$ connected in series, the converter includes two coupled inductors $L_1$ and $L_2$, and the two coupled inductors have a same number of turns;

- an undotted terminal of one coupled inductor $L_1$ of the converter is connected to a dotted terminal of the other coupled inductor $L_2$ of the converter, a dotted terminal of the coupled inductor $L_1$ of the converter is connected between the near-end second power switch $Q_4$ and the near-end third power switch $Q_5$, and an undotted terminal of the other coupled inductor $L_2$ of the converter is connected between the far-end second power switch $Q_3$ and the far-end third power switch $Q_6$;
- a capacitor $C_1$ is arranged between a node between the near-end first power switch $Q_1$ and the near-end second power switch $Q_4$ of the near-end power conversion unit and a ground terminal node of the far-end second power switch $Q_3$ of the far-end power conversion unit;
- a capacitor $C_2$ is arranged between a ground terminal node of the near-end second power switch $Q_4$ of the near-end power conversion unit and a node between the far-end first power switch $Q_2$ and the far-end second power switch $Q_3$ of the far-end power conversion unit, and the capacitor $C_1$ is equal to the capacitor $C_2$; and
- a positive output port is connected to the two coupled inductors $L_1$ and $L_2$, a negative output port is connected to a negative input port, and the negative output port and the negative input port are further connected to the ground.

As a preferred solution, the two coupled inductors $L_1$ and $L_2$ are wound around a same magnetic core column.

Beneficial effects of the switched-capacitor coupled-inductor converter are as follows.

In this technical solution, the direct current voltage conversion ratio of X:1 may be flexibly implemented, where X is any value greater than or equal to 2. The proposed converter may control an output voltage by changing a duty cycle of a driving signal, and may implement real-time voltage regulation without changing a hardware circuit. For example, if a conversion ratio of 8:1 is to be implemented, the duty cycle may be changed to 25% through a controller. For example, if a conversion ratio of 16:1 is to be implemented, the duty cycle is changed to 12.5%. Different from another similar converter, the converter also has better responsiveness to a sudden change in load due to introduction of a reverse coupled inductor. Equivalent inductance of a circuit decreases and a rate of current change increases during the sudden change in load, so as to match a current required by the output faster and implement a smaller output voltage fluctuation. In addition, the reverse coupled inductor increases the equivalent inductance at a steady state, significantly reduces a current ripple, and greatly improves efficiency of the converter, generates less heat, and provides great convenience for a thermal design of an overall system, so that the technical solution has obvious advantages in the application fields of a 48V data center bus converter and a 48V on-board bus converter.

The two coupled inductors are integrated into a same magnetic core, which saves space on a board and may greatly increase the power density of the system.

Another technical problem to be resolved in the present invention is to provide a control method of a switched-capacitor coupled-inductor converter, so as to flexibly implement a direct current voltage conversion ratio of X:1, where X is any numerical value greater than or equal to 4. The switched-capacitor coupled-inductor converter has a low output ripple, a high dynamic response rate, and a high power density, so that the switched-capacitor coupled-inductor converter may be used as a data center bus converter, an on-board bus converter, and the like.

To resolve the foregoing technical problem, a technical solution used in the present invention is the control method of the switched-capacitor coupled-inductor converter described above, where the near-end first power switch $Q_1$, the far-end second power switch $Q_3$, and the near-end third power switch $Q_5$ are controlled to be simultaneously turned off and turned on by a control signal I, the far-end first power switch $Q_2$, the near-end second power switch $Q_4$, and the far-end third power switch $Q_6$ are controlled to be simultaneously turned off and turned on by a control signal II, and phases of the control signal I and the control signal II are offset from each other by 180 degrees.

Beneficial effects of the control method of the switched-capacitor coupled-inductor converter are as follows.

The control method may cause the switched-capacitor coupled-inductor converter to flexibly implement the direct current voltage conversion ratio of X:1, where X is any value greater than or equal to 4. The proposed converter may control an output voltage by changing a duty cycle of a driving signal, and may implement real-time voltage regulation without changing a hardware circuit. For example, if a conversion ratio of 8:1 is to be implemented, the duty cycle may be changed to 25% through a controller. For example, if a conversion ratio of 16:1 is to be implemented, the duty cycle is changed to 12.5%. Different from another similar converter, the converter also has better responsiveness to a sudden change in load due to introduction of a reverse coupled inductor. Equivalent inductance of a circuit decreases and a rate of current change increases during the sudden change in load, so as to match a current required by the output faster and implement a smaller output voltage fluctuation. In addition, the reverse coupled inductor increases the equivalent inductance in a steady state, significantly reduces a current ripple, and greatly improves efficiency of the converter, generates less heat, and provides great convenience for a thermal design of an overall system. In addition, the two coupled inductors are integrated into a same magnetic core, which saves space on a board and greatly increases the power density of the system, so that the technical solution has obvious advantages in the application fields of a 48V data center bus converter and the 48V on-board bus converter.

Still another technical problem to be resolved in the present invention is to provide a control method of a switched-capacitor coupled-inductor converter, so that a duty cycle D thereof is greater than 0.5, which enables a conversion ratio of the converter to implement a variable conversion ratio such as 1:3 and 1:2.

To resolve the foregoing technical problem, a technical solution used in the present invention is the control method of the switched-capacitor coupled-inductor converter described above. The far-end second power switch $Q_3$ and the near-end third power switch $Q_5$ are controlled to be turned off and turned on by a control signal I, the near-end second power switch $Q_4$ and the far-end third power switch $Q_6$ are controlled to be turned off and turned on by a control signal II, and phases of the control signal I and the control signal II are offset from each other by 180 degrees. The near-end first power switch $Q_1$ and the control signal II of the near-end second power switch $Q_4$ and the far-end third power switch $Q_6$ complement each other to control a power switch action, and the far-end first power switch $Q_2$ and the control signal I of the far-end second power switch $Q_3$ and the near-end third power switch $Q_5$ complement each other to control the power switch action.

Beneficial effects of the control method of the switched-capacitor coupled-inductor converter are as follows.

This method implements a breakthrough of the duty cycle through timing adjustment. The duty cycle D is greater than 0.5, which completely makes up for the deficiency of a conventional control method in which a conversion ratio is less than 0.25, so that the conversion ratio of the converter may implement the variable conversion ratio such as 1:3 and 1:2. For example, in a typical 40-60V to 12V voltage regulation scenario in which 12V is needed, in the case of a 40V input, in the conventional control method, even if the maximum duty cycle is 0.5, and the obtained conversion ratio is only ¼, to be specific, the maximum output is 10V, the required 12V output voltage cannot be reached, while in the same application scenario, in the present method, the duty cycle may be 0.6 in this case, so that the 12V output may be implemented to satisfy a conversion requirement.

DETAILED DESCRIPTION

Specific implementations of the present invention are described in detail below with reference to the accompanying drawings.

As shown in FIG. 2 to FIG. 6, a switched-capacitor coupled-inductor converter is provided, including a positive input interface, a negative input interface, a positive output interface, a negative output interface, a converter, and a near-end power conversion unit and a far-end power conversion unit connected in parallel between the positive input interface and the negative input interface. An output capacitor is arranged between the positive output interface and the negative output interface. The near-end power conversion unit includes a near-end first power switch $Q_1$, a near-end second power switch $Q_4$, and a near-end third power switch $Q_5$ connected in series, the far-end power conversion unit includes a far-end first power switch $Q_2$, a far-end second power switch $Q_3$, and a far-end third power switch $Q_6$ connected in series, and the converter includes two coupled inductors $L_1$ and $L_2$. The two coupled inductors have a same number of turns, and the two coupled inductors $L_1$ and $L_2$ are wound around a same magnetic core column.

An undotted terminal of one coupled inductor $L_1$ of the converter is connected to a dotted terminal of the other coupled inductor $L_2$ of the converter, a dotted terminal of the coupled inductor $L_1$ of the converter is connected between the near-end second power switch $Q_4$ and the near-end third power switch $Q_5$, and an undotted terminal of the other coupled inductor $L_2$ of the converter is connected between the far-end second power switch $Q_3$ and the far-end third power switch $Q_6$.

A capacitor $C_1$ is arranged between a node between the near-end first power switch $Q_1$ and the near-end second power switch $Q_4$ of the near-end power conversion unit and a ground terminal node of the far-end second power switch $Q_3$ of the far-end power conversion unit.

A capacitor $C_2$ is arranged between a ground terminal node of the near-end second power switch $Q_4$ of the near-end power conversion unit and a node between the far-end first power switch $Q_2$ and the far-end second power switch $Q_3$ of the far-end power conversion unit, and the capacitor $C_1$ is equal to the capacitor $C_2$.

A positive output port is connected to the two coupled inductors $L_1$ and $L_2$, a negative output port is connected to a negative input port, and the negative output port and the negative input port are further connected to the ground.

Figure 4:
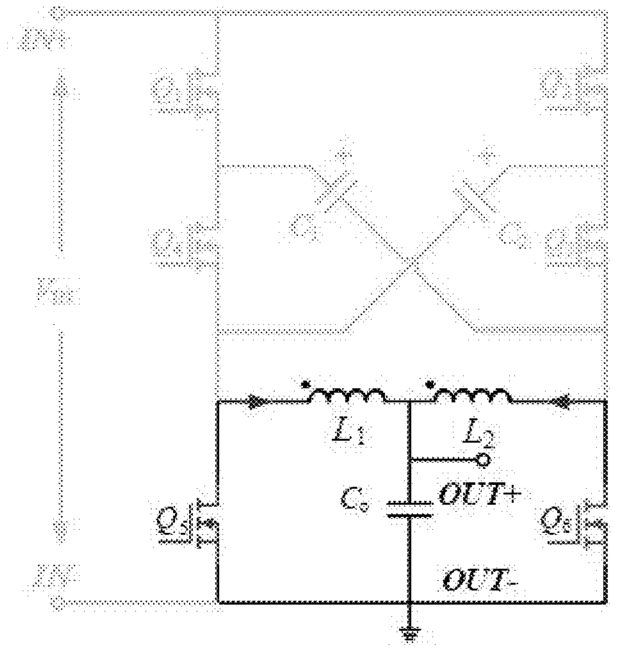
FIG. 4 is a schematic diagram of an equivalent circuit of modes II and IV according to a control method I of a switched-capacitor coupled-inductor converter.
Figure 5:
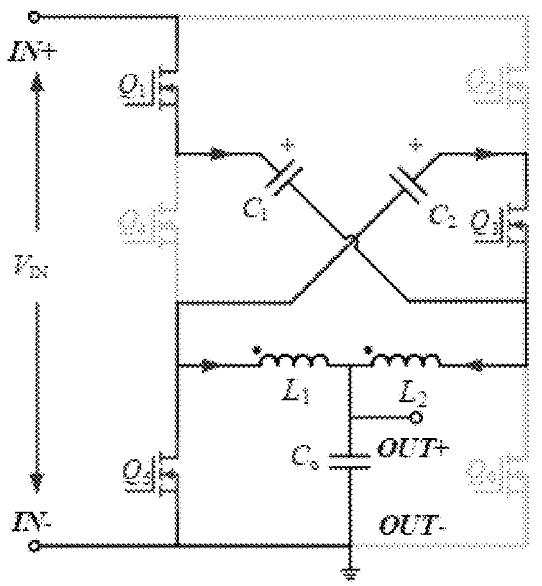
FIG. 5 is a schematic diagram of an equivalent circuit of a mode III according to a control method I of a switched-capacitor coupled-inductor converter.
Figure 6:
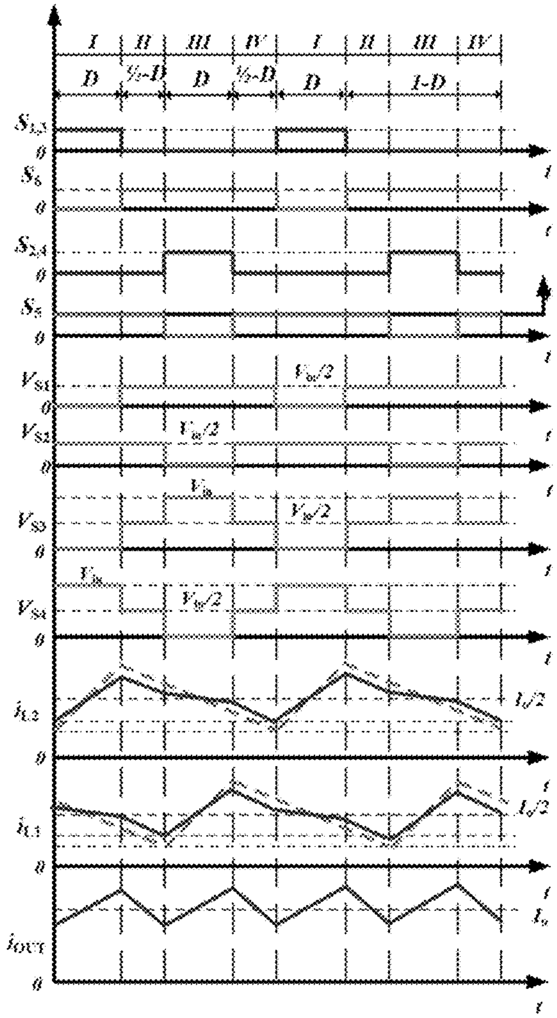
FIG. 6 is a waveform of a control method I of a switched-capacitor coupled-inductor converter.

As shown in FIG. 4 to FIG. 6, the control method of the switched-capacitor coupled-inductor converter described above is specifically as follows: controlling, by a control signal I, the near-end first power switch $Q_1$, the far-end second power switch $Q_3$, and the near-end third power switch $Q_5$ to be simultaneously turned off and turned on, and controlling, by a control signal II, the far-end first power switch $Q_2$, the near-end second power switch $Q_4$, and the far-end third power switch $Q_6$ to be simultaneously turned off and turned on, where phases of the control signal I and the control signal II are offset from each other by 180 degrees.

A duty cycle of each phase is adjustable and a maximum duty cycle does not exceed 50%, to change a conversion ratio in real time.

Figure 1:
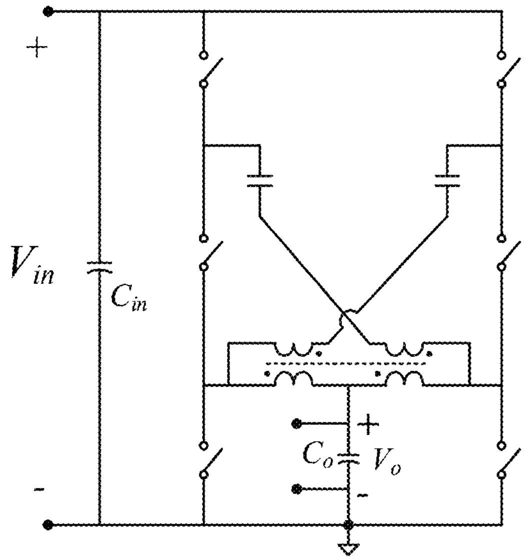
FIG. 1 is an existing hybrid switched capacitor conversion circuit.
Figure 2:
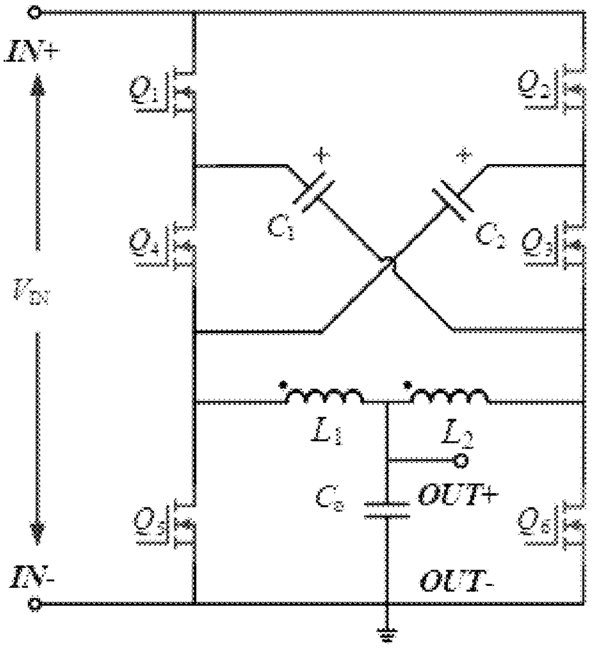
FIG. 2 is a schematic diagram of a circuit topology of a switched-capacitor coupled-inductor converter.
Figure 3:
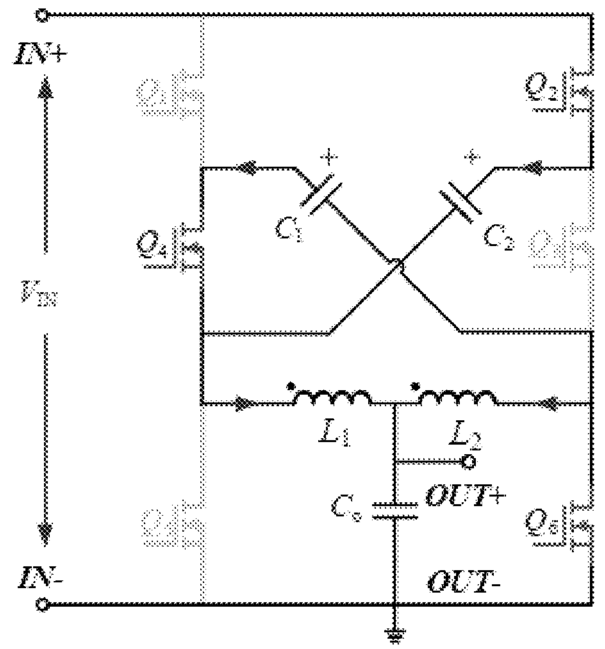
FIG. 3 is a schematic diagram of an equivalent circuit of a mode I according to a control method I of a switched-capacitor coupled-inductor converter.

FIG. 2 shows an equivalent circuit when the duty cycle of the converter is less than 0.5. In this case, the circuit has three operating modes (equivalent circuits of modes II and IV are the same at a freewheeling stage).

A power switch $Q_1$ and a power switch $Q_3$ are controlled to be turned off and turned on by a same control signal. A power switch $Q_2$ and a power switch $Q_4$ are controlled to be turned off and turned on by a same control signal. The phases of the two control signals are offset from each other by 180 degrees. Driving signals of $Q_5$, $Q_2$, and $Q_4$ complement each other to control a power switch operation. Driving signals of $Q_6$, $Q_1$ and $Q_3$ complement each other to control the power switch operation. When the load is large enough, $Q_5$ and $Q_6$ may implement a zero voltage switch ZVS, and all of $Q_1$, $Q_2$, $Q_3$, and $Q_4$ adopt hard switching.

At a moment of the mode I, the power switch $Q_2$, the power switch $Q_4$, and $Q_6$ are turned off. The input voltage charges an inductor $L_1$ through $C_2$, and $C_1$ also charges $L_1$. $L_2$ is in a freewheeling state, current through $L_2$ decreases linearly, and the slope is related to an equivalent inductance.

The coupled inductor does not affect analysis of a steady-state conversion ratio and a steady-state voltage of a capacitor. It may be learned from volt-second balance that if an average voltage of the inductor in the steady state is 0, an average voltage $V_4$ of the switch $Q_4$ is equal to the steady-state voltage $V_{C1}$ of $C_1$, so as to obtain Equation (1):

$$\langle V_4 \rangle = V_{C1} = DV_{in} + (1-2D)V_{C1}, \quad (1)$$

where D is a duty cycle of the converter.

The voltage of the capacitor $C_1$ may be deduced, as shown in Equation (2):

$$V_{C1} = \frac{V_{in}}{2}. \quad (2)$$

At a moment of the modes II and IV, the power switch $Q_5$ and the power switch $Q_6$ are turned off. $L_1$ and $L_2$ are in the freewheeling state, the current decreases linearly, and the slope is related to the equivalent inductance.

The coupled inductor does not affect analysis of the steady-state conversion ratio and the steady-state voltage of the capacitor. A volt-second balance equation (3) for $L_1$ is given as follows:

$$\left(\frac{V_{in}}{2} - V_o\right)DT = V_o(1-D)T, \quad (3)$$

where Vo is an output voltage of a circuit.

The conversion ratio of the converter may be deduced, as shown in Equation (4):

$$\frac{V_o}{V_{in}} = \frac{D}{2}. \quad (4)$$

At a moment of the mode III, the power switch $Q_1$, the power switch $Q_3$, and $Q_5$ are turned off. The input voltage charges an inductor $L_2$ through $C_1$, and $C_2$ also charges $L_2$. $L_1$ is in the freewheeling state, the current decreases linearly, and the slope is related to the equivalent inductance.

The coupled inductor does not affect analysis of the steady-state conversion ratio and the steady-state voltage of the capacitor. It may be learned from the volt-second balance that if an average voltage of the inductor in the steady state is 0, an average voltage of the switch $Q_3$ is equal to the steady-state voltage of $C_2$, so as to obtain Equation (5):

$$\langle V_3\rangle = V_{C2} = DV_{in} + (1-2D)V_{C2}. \tag{5}$$

The voltage of the capacitor $C_2$ may be deduced, as shown in Equation (6):

$$V_{C2} = \frac{V_{in}}{2}. \tag{6}$$

Equation (7) and Equation (8) may be obtained based on the basic equation of the coupled inductor:

$$v_1 = L_1\frac{di_1}{dt} + M\frac{di_2}{dt}, \text{ and} \tag{7}$$

$$v_2 = L_2\frac{di_2}{dt} + M\frac{di_1}{dt}, \tag{8}$$

where $i_1$ and $i_2$ are respectively currents of $L_1$ and $L_2$.

Because of a symmetrical design, let $L_1=L_2=L$, a mutual inductance is $M=kL$, where k is a coupling coefficient and satisfies $k<0$, so as to further derive Equation (9):

$$v_1 - kv_2 = (1-k^2)L\frac{di_1}{dt}. \tag{9}$$

If a relationship between $v_1$ and $v_2$ is obtained based on a specific voltage situation of the two inductors, Equation (9) may be simplified to a form of Equation (10):

$$v_1 = L_{eq}\frac{di_1}{dt}, \tag{10}$$

where $L_{eq}$ is an equivalent inductance.

Three voltage situations of the two inductors when the duty cycle D of the converter is less than 0.5 are specifically analyzed below.

First, let $v_a$ and $v_b$ be respectively Equation (11) and Equation (12):

$$v_a = \frac{V_{in}}{2} - V_o > 0, \text{ and} \tag{11}$$

$$v_b = -V_o < 0. \tag{12}$$

First situation: $L_1$ has a positive pressure, and $L_2$ has a negative pressure.

The voltages are respectively shown in Equation (13) and Equation (14):

$$v_1 = v_a = \frac{V_{in}}{2} - V_o > 0, \text{ and} \tag{13}$$

$$v_2 = v_b = -V_o < 0. \tag{14}$$

It may be deduced that a relationship between $v_2$ and $v_1$ is shown in Equation (15):

$$v_2 = -\frac{D}{1-D}. \tag{15}$$

Equation (15) and Equation (9) may be combined to obtain the equivalent inductance Legi at this stage in Equation (16):

$$L_{eq1} = \frac{1-k^2}{1+k\frac{D}{1-D}}L. \tag{16}$$

Second situation: $L_1$ has a negative pressure, and $L_2$ has a negative pressure.

The voltages are respectively shown in Equation (17) and Equation (18):

$$v_1 = v_b = -V_o < 0, \text{ and} \tag{17}$$

$$v_2 = v_b = -V_o < 0. \tag{18}$$

It may be deduced that a relationship between $v_2$ and $v_1$ is shown in Equation (19):

$$v_2 = v_1. \tag{19}$$

Equation (19) and Equation (9) may be combined to obtain the equivalent inductance $L_{eq2}$ at this stage in Equation (20):

$$L_{eq2} = (1+k)L. \tag{20}$$

Third situation: $L_1$ has a negative pressure, and $L_2$ has a positive pressure.

The voltages are respectively shown in Equation (21) and Equation (22):

$$v_1 = v_b = -V_o < 0, \text{ and} \tag{21}$$

$$v_2 = v_a = \frac{V_{in}}{2} - V_o > 0. \tag{22}$$

It may be deduced that a relationship between $v_2$ and $v_1$ is shown in Equation (23):

$$v_2 = -\frac{1-D}{D}v_1. \tag{23}$$

Equation (23) and Equation (9) may be combined to obtain the equivalent inductance $L_{eq3}$ at this stage in Equation (24):

$$L_{eq3} = \frac{1-k^2}{1+k\frac{1-D}{D}}L. \tag{24}$$

When the duty cycle is less than 0.5, a current ripple is determined by the equivalent inductance $L_{eq1}$.

$L_{eq1}$ is set to be greater than L, an equivalent inductance increase condition (that is, a ripple reduction condition) may be obtained as Equation (25):

$$-k < \frac{D}{1-D}. \tag{25}$$

A dynamic equivalent inductance is analyzed. An example in which the duty cycle is increased is used. It is assumed that the duty cycle is transformed by ΔD and the current is changed by Δi, Equation (26):

$$\Delta i = \left(\frac{V_a}{L_{eq1}} - \frac{V_b}{L_{eq2}} + \frac{V_b}{L_{eq3}} - \frac{V_b}{L_{eq2}}\right)\Delta DT \tag{26}$$

is derived for a single inductor.

Based on steady-state volt-second balance, Equation (27):

$$\frac{V_a}{L_{eq1}}DT + \frac{V_b}{L_{eq2}}(1-2D)T + \frac{V_b}{L_{eq3}}DT = 0 \tag{27}$$

is obtained.

Equation (26) and Equation (27) are combined to obtain Equation (28):

$$\frac{\Delta i}{T} = \frac{V_{in}}{L_{eq2}}\Delta D, \tag{28}$$

where T is a switching period.

It may be seen that factors affecting a current rise rate of the current are: a duty cycle increment, an input voltage, and the equivalent inductance $L_{eq2}$.

Since reverse coupling k is less than 0, it may be learned that $L_{eq2}=(1+k)L<L$, and the dynamic equivalent inductance decreases. To be specific, the topology described in this application significantly improves dynamic performance of the converter by using the coupled inductor.

| Power switch | Voltage stress | Current stress | Soft switching |
|---|---|---|---|
| Near-end first power switch $Q_1$<br>Far-end first power switch $Q_2$ | $V_{in}/2$ | $(I_0/4)D$ | N/A |
| Near-end second power switch $Q_3$<br>Far-end second power switch $Q_4$ | $V_{in}$ | $(I_0/4)D$ | N/A |
| Near-end third power switch $Q_5$<br>Far-end third power switch $Q_6$ | $V_{in}/2$ | $(I_0/2)(1-D)$ | Heavy load ZVS |

The power switch may be a power semiconductor device such as an Si MOSFET, a GaN HEMT, and a SiC MOSFET. $Q_5$ and $Q_6$ operate in a synchronous rectification mode, which may be replaced by diodes.

As shown in FIG. 7 to FIG. 10, another control method of a switched-capacitor coupled-inductor converter that may implement the duty cycle D being greater than 0.5 so that a conversion ratio of the converter may implement a variable conversion ratio such as 1:3 and 1:2 is specifically as follows: controlling, by a control signal I, the far-end second power switch $Q_3$ and the near-end third power switch $Q_5$ to be turned off and turned on, and controlling, by a control signal II, the near-end second power switch $Q_4$ and the far-end third power switch $Q_6$ to be turned off and turned on, where phases of the control signal I and the control signal II are offset from each other by 180 degrees, the near-end first power switch $Q_1$ and the control signal II of the near-end second power switch $Q_4$ and the far-end third power switch $Q_6$ complement each other to control a power switch action, and the far-end first power switch $Q_2$ and the control signal I of the far-end second power switch $Q_3$ and the near-end third power switch $Q_5$ complement each other to control the power switch action.

Figure 7:
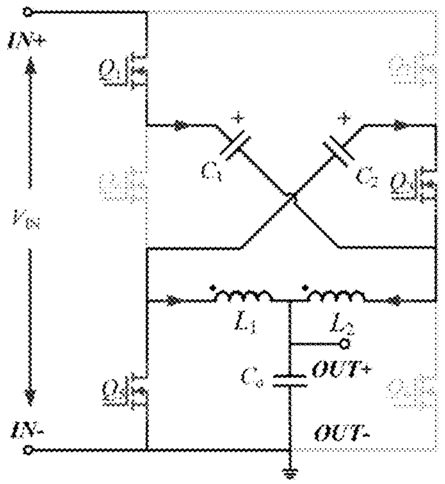
FIG. 7 is a schematic diagram of an equivalent circuit of a mode I according to a control method II of a switched-capacitor coupled-inductor converter.

As shown in FIG. 7, at a moment of the mode I, the near-end first power switch $Q_1$, the far-end second power switch $Q_3$, and the near-end third power switch $Q_5$ are turned off. The input voltage charges the inductor $L_2$ through the capacitor $C_1$, and $C_2$ also charges the inductor $L_2$. The inductor $L_1$ is in a freewheeling state, a current decreases linearly, and a slope is related to an equivalent inductance.

The coupled inductor does not affect analysis of the steady-state conversion ratio and the steady-state voltage of the capacitor. It may be learned from the volt-second balance that if an average voltage of the inductor in the steady state is 0, an average voltage of the far-end second power switch $Q_3$ is equal to the steady-state voltage of the capacitor $C_2$, so as to obtain Equation (29):

$$V_3 = V_{C2} = DV_{in} + (1-2D)V_{C2}. \tag{29}$$

In the equation, $V_{c2}$ is derived from Equation (30):

$$V_{C2} = \frac{V_{in}}{2}. \tag{30}$$

Figure 8:
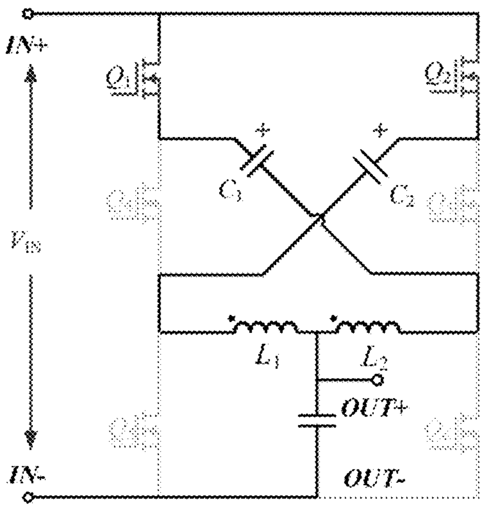
FIG. 8 is a schematic diagram of an equivalent circuit of modes II and IV according to a control method II of a switched-capacitor coupled-inductor converter.

As shown in FIG. 8, at a moment of the modes II and IV, the near-end first power switch $Q_1$ and the far-end first power switch $Q_2$ are turned off. The inductor $L_1$ and the inductor $L_2$ are in a freewheeling state, a current increases linearly, and a slope is related to the equivalent inductance.

The coupled inductor does not affect analysis of the steady-state conversion ratio and the steady-state voltage of the capacitor. A volt-second balance equation (31) for the inductor $L_1$ may be given as follows:

$$\left(\frac{V_{in}}{2} - V_o\right)DT = V_o(1-D)T. \tag{31}$$

The conversion ratio of the converter may be deduced, as shown in Equation (32):

$$M = \frac{V_o}{V_{in}} = \frac{D}{2}. \tag{32}$$

Figure 9:
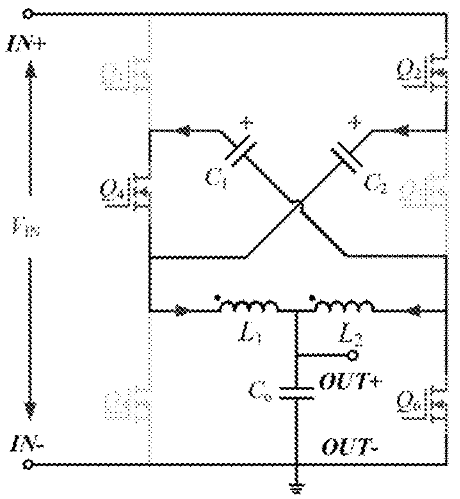
FIG. 9 is a schematic diagram of an equivalent circuit of a mode III according to a control method II of a switched-capacitor coupled-inductor converter.
Figure 10:
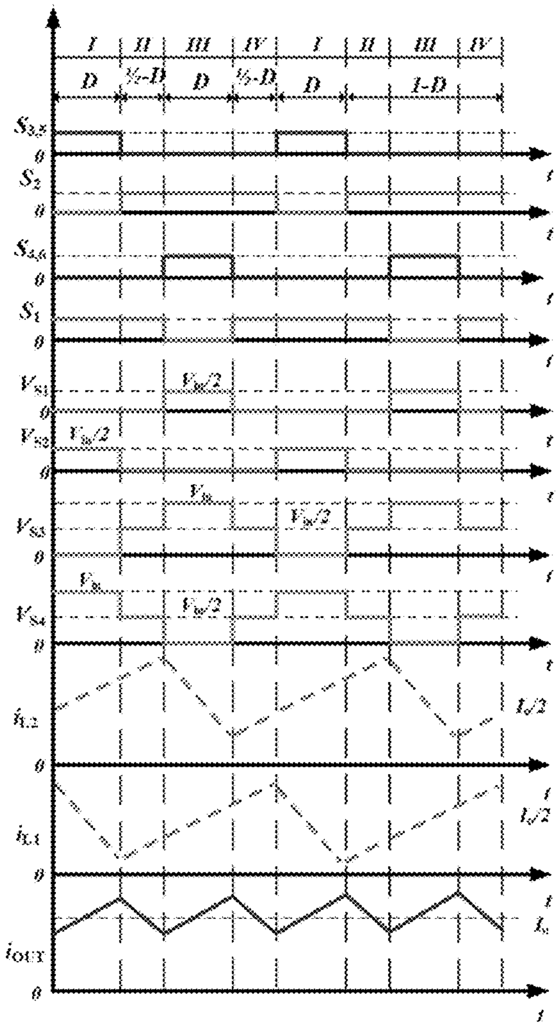
FIG. 10 is a waveform of a control method II of a switched-capacitor coupled-inductor converter.

As shown in FIG. 9, at a moment of the mode III, the far-end first power switch $Q_2$, the near-end second power switch $Q_4$, and the far-end third power switch $Q_6$ are turned off. The input voltage charges the inductor $L_1$ through the capacitor $C_2$, and $C_1$ also charges the inductor $L_1$. The inductor $L_2$ is in a freewheeling state, a current decreases linearly, and a slope is related to an equivalent inductance.

The coupled inductor does not affect analysis of the steady-state conversion ratio and the steady-state voltage of the capacitor. It may be learned from the volt-second balance that if an average voltage of the inductor in the steady state is 0, an average voltage of the near-end second power switch $Q_4$ is equal to the steady-state voltage of the capacitor $C_1$, so as to obtain Equation (33):

$$V_4 = V_{C1} = DV_{in} + (1 - 2D)V_{C1}. \tag{33}$$

The voltage of the capacitor $C_1$ may be deduced, as shown in Equation (34):

$$V_{C1} = \frac{V_{in}}{2}. \tag{34}$$

The above embodiments only exemplarily describe the principles and effects of the present invention, and some applied embodiments are not intended to limit the present invention. It should be noted that a person of ordinary skill in the art may further make several modifications and improvements without departing from the inventive concept of the present invention, which all fall within the protection scope of the present invention.

What is claimed is:

1. A switched-capacitor coupled-inductor converter, comprising a positive input interface, a negative input interface, a positive output interface, a negative output interface, a converter, and a near-end power conversion unit and a far-end power conversion unit connected in parallel between the positive input interface and the negative input interface, wherein an output capacitor is arranged between the positive output interface and the negative output interface, the near-end power conversion unit comprises a near-end first power switch $Q_1$, a near-end second power switch $Q_4$, and a near-end third power switch $Q_5$ connected in series, the far-end power conversion unit comprises a far-end first power switch $Q_2$, a far-end second power switch $Q_3$, and a far-end third power switch $Q_6$ connected in series, the converter comprises two coupled inductors $L_1$ and $L_2$, and the two coupled inductors have a same number of turns;

an undotted terminal of one coupled inductor $L_1$ of the converter is connected to a dotted terminal of the other coupled inductor $L_2$ of the converter, a dotted terminal of the coupled inductor $L_1$ of the converter is connected between the near-end second power switch $Q_4$ and the near-end third power switch $Q_5$, and an undotted terminal of the other coupled inductor $L_2$ of the converter is connected between the far-end second power switch $Q_3$ and the far-end third power switch $Q_6$;

a capacitor $C_1$ is arranged between a node between the near-end first power switch $Q_1$ and the near-end second power switch $Q_4$ of the near-end power conversion unit and a ground terminal node of the far-end second power switch $Q_3$ of the far-end power conversion unit;

a capacitor $C_2$ is arranged between a ground terminal node of the near-end second power switch $Q_4$ of the near-end power conversion unit and a node between the far-end first power switch $Q_2$ and the far-end second power switch $Q_3$ of the far-end power conversion unit, and the capacitor $C_1$ is equal to the capacitor $C_2$; and a positive output port is connected to the two coupled inductors $L_1$ and $L_2$, a negative output port is connected to a negative input port, and the negative output port and the negative input port are further connected to the ground, wherein the two coupled inductors $L_1$ and $L_2$ are wound around a same magnetic core column.

2. A control method of the switched-capacitor coupled-inductor converter according to claim 1, wherein the near-end first power switch $Q_1$, the far-end second power switch $Q_3$, and the near-end third power switch $Q_5$ are controlled to be simultaneously turned off and turned on by a control signal I, the far-end first power switch $Q_2$, the near-end second power switch $Q_4$, and the far-end third power switch $Q_6$ are controlled to be simultaneously turned off and turned on by a control signal II, and phases of the control signal I and the control signal II are offset from each other by 180 degrees.

3. A control method of the switched-capacitor coupled-inductor converter according to claim 1, wherein the far-end second power switch $Q_3$ and the near-end third power switch $Q_5$ are controlled to be turned off and turned on by a control signal I, the near-end second power switch $Q_4$ and the far-end third power switch $Q_6$ are controlled to be turned off and turned on by a control signal II, and phases of the control signal I and the control signal II are offset from each other by 180 degrees, the near-end first power switch $Q_1$ and the control signal II of the near-end second power switch $Q_4$ and the far-end third power switch $Q_6$ complement each other to control a power switch action, and the far-end first power switch $Q_2$ and the control signal I of the far-end second power switch $Q_3$ and the near-end third power switch $Q_5$ complement each other to control the power switch action.

4. A control method of the switched-capacitor coupled-inductor converter according to claim 1, wherein the near-end first power switch $Q_1$, the far-end second power switch $Q_3$, and the near-end third power switch $Q_5$ are controlled to be simultaneously turned off and turned on by a control signal I, the far-end first power switch $Q_2$, the near-end second power switch $Q_4$, and the far-end third power switch $Q_6$ are controlled to be simultaneously turned off and turned on by a control signal II, and phases of the control signal I and the control signal II are offset from each other by 180 degrees.

5. A control method of the switched-capacitor coupled-inductor converter according to claim 1, wherein the far-end second power switch $Q_3$ and the near-end third power switch $Q_5$ are controlled to be turned off and turned on by a control signal I, the near-end second power switch $Q_4$ and the far-end third power switch $Q_6$ are controlled to be turned off and turned on by a control signal II, and phases of the control signal I and the control signal II are offset from each other by 180 degrees, the near-end first power switch $Q_1$ and the control signal II of the near-end second power switch $Q_4$ and the far-end third power switch $Q_6$ complement each other to control a power switch action, and the far-end first power switch $Q_2$ and the control signal I of the far-end second power switch $Q_3$ and the near-end third power switch $Q_5$ complement each other to control the power switch action.

* * * * *